(12) United States Patent
Rao et al.

(10) Patent No.: US 12,093,126 B2
(45) Date of Patent: Sep. 17, 2024

(54) HTTP-URI ERROR-RECOVERY METHOD AND USER EQUIPMENT THEREOF

(71) Applicant: MediaTek Singapore Pte. Ltd., Singapore (SG)

(72) Inventors: Xiaolong Rao, Chengdu (CN); Ho-Wen Pu, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/056,343

(22) Filed: Nov. 17, 2022

(65) Prior Publication Data
US 2023/0161663 A1    May 25, 2023

(30) Foreign Application Priority Data

Nov. 22, 2021 (CN) .......................... 202111383371.9
Nov. 15, 2022 (CN) .......................... 202211428463.9

(51) Int. Cl.
G06F 11/07 (2006.01)
H04L 67/02 (2022.01)

(52) U.S. Cl.
CPC ...... G06F 11/0793 (2013.01); G06F 11/0709 (2013.01); H04L 67/02 (2013.01)

(58) Field of Classification Search
CPC ... G06F 11/0793; G06F 11/0709; H04L 67/02
USPC .......................................................... 714/18
See application file for complete search history.

(56) References Cited

U.S. PATENT DOCUMENTS

| 11,843,840 B2 | 12/2023 | Stockhammer |
| 2017/0053035 A1* | 2/2017 | Divringi ............. G06F 16/9554 |
| 2021/0294869 A1* | 9/2021 | Gedliczka ........... G06F 16/9566 |

FOREIGN PATENT DOCUMENTS

| CN | 108882184 B | 6/2021 |
| TW | 202130189 A | 8/2021 |
| WO | 2016/173654 A1 | 11/2016 |

OTHER PUBLICATIONS

Chinese language office action dated Mar. 30, 2023, issued in application No. TW 111144360.
Rosenberg, J.; "The Extensible Markup Language (XML) Configuration Access Protocol (XCAP);" Network Working Group, Standards Track; May 2007; pp. 1-71.
3rd Generation Partnership Project; "Extensible Markup Language (XML) Configuration Access Protocol (XCAP) over the Ut interface for Manipulating Supplementary Services;" Dec. 2020; pp. 1-31.
Chinese language Notice of Allowance dated Jun. 25, 2024, issued in application No. TW 111144360.

* cited by examiner

Primary Examiner — Yair Leibovich
(74) Attorney, Agent, or Firm — McClure, Qualey & Rodack, LLP

(57) ABSTRACT

A Hyper Text Transfer Protocol (HTTP)-Uniform Resource Identifier (URI) error-recovery method is provided. The HTTP-URI error-recovery method is applied in user equipment (UE). The HTTP-URI error-recovery method includes the following steps. The UE transmits a first HTTP request with a first URI encoding scheme to an application server through an interface. Then, the UE receives a specific error response corresponding to the first HTTP request from the application server. Then, the UE transmits a second HTTP request with a second encoding scheme to the application server based on the specific error response.

16 Claims, 7 Drawing Sheets

HTTP-URI ERROR-RECOVERY METHOD AND USER EQUIPMENT THEREOF

CROSS REFERENCE TO RELATED APPLICATIONS

This Application claims priority of CN Patent Application No. 202111383371.9 filed on Nov. 22, 2021 and CN Patent Application No. 202211428463.9 filed on Nov. 15, 2022, the entirety of which is incorporated by reference herein.

BACKGROUND OF THE INVENTION

Field of the Invention

The invention generally relates to wireless communication technology, and more particularly, to a Hyper Text Transfer Protocol (HTTP)-Uniform Resource Identifier (URI) transmission.

Description of the Related Art

In Internet Protocol (IP) Multimedia Subsystem (IMS), one of the principal parts for multimedia telephony communication service is Supplementary Service (e.g., call forwarding, call waiting, and so on) to user equipment (UE). The service configuration of the Supplementary Service is stored in an application server with Extensible Markup Language (XML) format.

If the UE wants to change the configuration of specific Supplementary Service, the UE may need to communicate with the application server through a Ut interface. When the UE wants to interrogate or modify the status of Supplementary Service, the UE will initiate a XML Configuration Access Protocol (XCAP) Hyper Text Transfer Protocol (HTTP) request to application server to obtain the latest status of the Supplementary Service. The XCAP (XML Configuration Access Protocol) can be used to map XML document sub-trees and element attributes to HTTP Uniform Resource Identifiers (URIs). The XCAP HTTP request URI may be constructed with specific format as defined in Request for Comments (RFC) standard and 3rd Generation Partnership Project (3GPP) standard.

However, when the UE receives an error response from the application server, the UE is usually hard to detect what kind of error happen, because different operators have different configurations in the application server. It will take much effort and time to recognize and fix the issue. In addition, the URI character encoding issue is one of the most frequently suffered issue.

Therefore, how to recover from URI character encoding error rapidly is a topic that is worthy of discussion.

BRIEF SUMMARY OF THE INVENTION

A Hyper Text Transfer Protocol (HTTP)-Uniform Resource Identifier (URI) error-recovery method and user equipment (UE) are provided to overcome the problems mentioned above.

An embodiment of the invention provides a Hyper Text Transfer Protocol (HTTP)-Uniform Resource Identifier (URI) error-recovery method. The HTTP-URI error-recovery method is applied in user equipment (UE). The HTTP-URI error-recovery method includes the following steps. The UE transmits a first HTTP request with a first URI encoding scheme to an application server through an interface. Then, the UE receives a specific error response corresponding to the first HTTP request from the application server. Then, the UE transmits a second HTTP request with a second encoding scheme to the application server based on the specific error response.

In some embodiments, the interface is a Ut interface.

In some embodiments, the specific error response is a Bad Request error response, a Not Found error response or a Conflict error response.

In some embodiments, the first HTTP request and the second HTTP request comprise one or more specific characters. In an embodiment, the first URI encoding scheme is that the one or more specific characters in the first HTTP request are encoded based on percent-encoding and the second URI encoding scheme is that that the one or more specific characters in the second HTTP request are not encoded based on percent-encoding. In another embodiment, the first URI encoding scheme is that the one or more specific characters in the first HTTP request are not encoded based on percent-encoding and the second URI encoding scheme is that that the one or more specific characters in the second HTTP request are not encoded based on percent-encoding. In some embodiments, the one or more specific characters comprise at least one of unsafe characters and reserved characters.

In some embodiments, in the HTTP-URI error-recovery method, the UE may further receive a response corresponding to the second HTTP request from the application server and determine whether the response is an error response. The UE may record the second encoding scheme when the response is not the error response, and it may display the latest service status based on the response. The UE may display an error notification based on the response when the response is the error response.

An embodiment of the invention provides user equipment (UE) for Hyper Text Transfer Protocol (HTTP)-Uniform Resource Identifier (URI) error-recovery. The UE includes a processor, a receiver and a transmitter. The processor is coupled to the transmitter and the receiver. The transmitter may transmit a first HTTP request with a first URI encoding scheme to an application server through an interface. The receiver may receive a specific error response corresponding to the first HTTP request from the application server. The transmitter further transmits a second HTTP request with a second encoding scheme to the application server based on the specific error response.

Other aspects and features of the invention will become apparent to those with ordinary skill in the art upon review of the following descriptions of specific embodiments of the HTTP-URI error-recovery method and UE.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
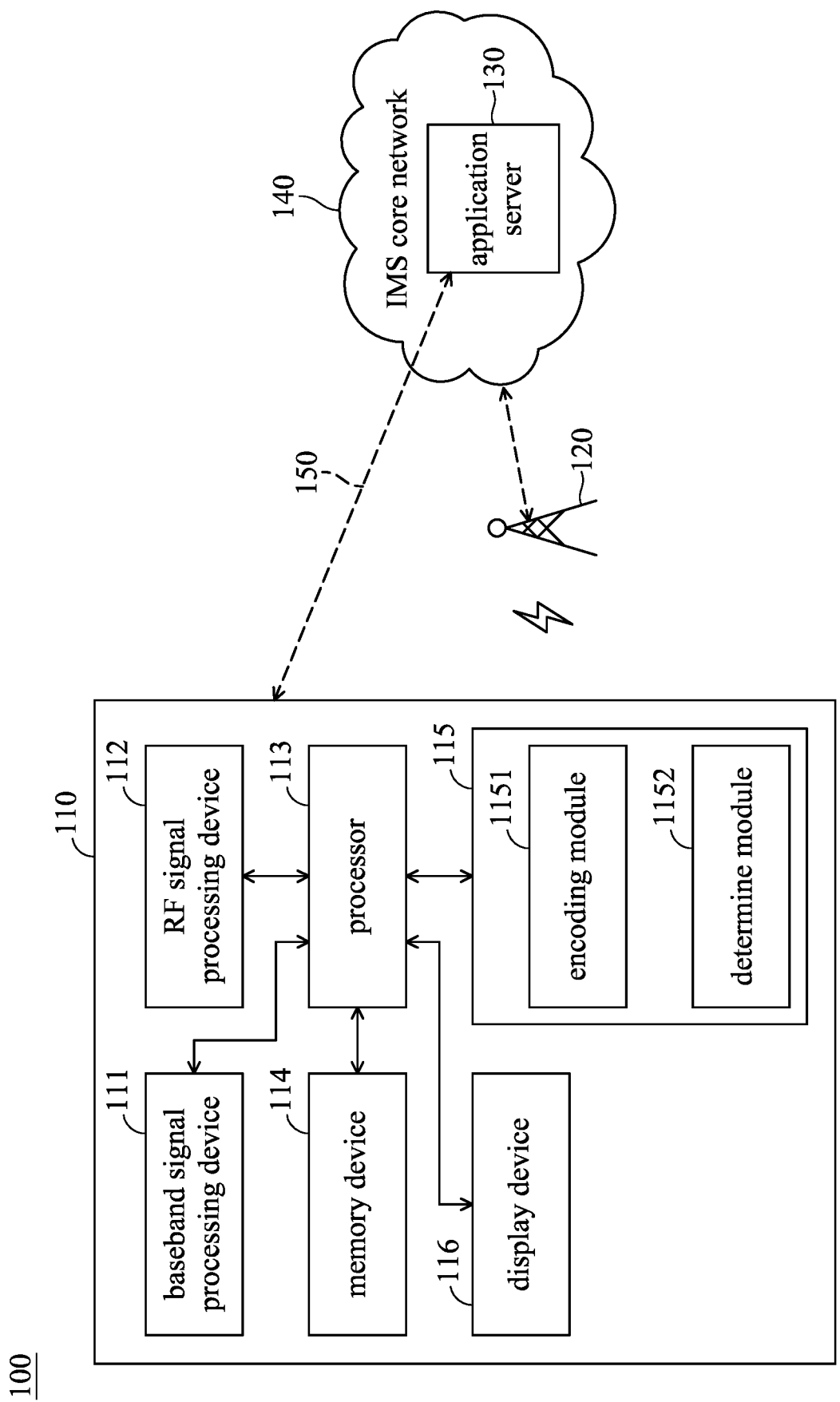
FIG. 1 is a block diagram of a wireless communications system according to an embodiment of the invention.

FIG. 1 is a block diagram of a wireless communications system 100 according to an embodiment of the invention. As shown in FIG. 1, the wireless communications system 100 may comprise user equipment (UE) 110, a network node 120, an application server 130, an Internet Protocol (IP) Multimedia Subsystem (IMS) core network 140 and an interface 150. It should be noted that in order to clarify the concept of the invention, FIG. 1 presents a simplified block diagram in which only the elements relevant to the invention are shown. However, the invention should not be limited to what is shown in FIG. 1.

In the embodiments, the network node 120 may be a base station, a gNodeB (gNB), a NodeB (NB) an eNodeB (eNB), an access point, an access terminal, but the invention should not be limited thereto. In the embodiments, the UE 110 may communicate with the network node 120 through the fifth generation (5G) communication technology or 5G New Radio (NR) communication technology, but the invention should not be limited thereto.

In the embodiments, the application server 130 may process the supplementary service (e.g., call forwarding service, call waiting service, and so on) provided to the UE 110 in the IMS core network 140. The data associated with the supplementary service may be stored in the application server 130 by an Extensible Markup Language (XML) format. The application server 130 may provide configurations and data associated with the supplementary service to the UE 110. In addition, the application server 130 may communicates with the UE 110 through the interface 150. In an embodiment, the interface 150 may be a Ut interface.

As shown in FIG. 1, the UE 110 may comprise at least a baseband signal processing device 111, a radio frequency (RF) signal processing device 112, a processor 113, a memory device 114, function modules and circuits 115 and a display device 116.

In the embodiments of the invention, the UE 110 may be a smartphone, Personal Data Assistant (PDA), pager, laptop computer, desktop computer, wireless handset, or any computing device that includes a wireless communications interface.

The RF signal processing device 112 may comprise a plurality of antennas to receive or transmit RF signals. The RF signal processing device 112 may receive RF signals via the antennas and process the received RF signals to convert the received RF signals to baseband signals to be processed by the baseband signal processing device 111, or receive baseband signals from the baseband signal processing device 211 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, analog-to-digital converter (ADC)/digital-to-analog converter (DAC), etc.

The baseband signal processing device 111 may further process the baseband signals to obtain information or data transmitted by the peer communications apparatus. The baseband signal processing device 111 may also comprise a plurality of hardware elements to perform baseband signal processing.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software modules.

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 1.

The function modules and circuits 115 may comprise an encoding module 1151 and a determine module 1152. The processor 113 may execute different modules or circuits in the function modules and circuits 115 to perform embodiments of the present invention. In the embodiment of the invention, the encoding module 1151 may encode the specific characters in the Hyper Text Transfer Protocol (HTTP) request based on an Uniform Resource Identifier (URI) encoding scheme. The determine module 1152 may determine whether a response for the HTTP request from the application server 130 is an error response and determine whether the error response is a specific (or pre-defined) error response.

The display device 116 may be a Liquid-Crystal Display (LCD), a Light-Emitting Diode (LED) display, an Organic LED (OLED) display, or an Electronic Paper Display (EPD), etc., for providing a display function. Alternatively, the display device 116 may further include one or more touch sensors for sensing touches, contacts, or approximations of objects, such as fingers or styluses.

According to an embodiment of the invention, when the UE 110 wants to interrogate or modify the status of supplementary service (e.g., call forwarding service), the UE 110 may initiate (or transmit) a first HTTP request to the application server 130 through the interface 150 (i.e., Ut interface) to obtain the latest status of supplementary service. Specifically, the UE 110 may construct the URI of the first HTTP request based on a specific encoding or format defined in XML Configuration Access Protocol (XCAP). In an embodiment, after the UE 110 construct the URI of the first HTTP request, the UE 110 may further construct the head and data of the first HTTP request. After the UE 110 has constructed the first HTTP request, the UE 110 may transmit the first HTTP request to the application server 130 through the interface 150 (i.e., Ut interface).

The constructed URI of the first HTTP request may comprise one or more specific characters (e.g., +, @, [,], double quotes, space symbol and so on). In the constructed URI of the first HTTP request, the specific characters may be encoded by the UE 110 based on a URI encoding scheme. In an embodiment, the URI encoding scheme may be that the specific characters in the first HTTP request are encoded based on percent-encoding (e.g., + is encoded to %2B based on percent-encoding). In another embodiment, the URI encoding scheme may be that the specific characters in the first HTTP request are not encoded based on percent-encoding (e.g., + is not encoded to %2B based on percent-encoding).

When the application server 130 receives the first HTTP request, the application server 130 may transmit a response for the first HTTP request to the UE 110. When the response is a specific (or pre-defined) error response, the UE 110 may transmit a second HTTP request to the application server 130 through the interface 150. In an embodiment of the invention, the specific error response may be a Bad Request error response, a Not Found error response or a Conflict error response, but the invention should not be limited thereto. The types of specific error responses may be pre-defined for the URI error-recovery.

When the UE 110 receives the response for the second HTTP request from the application server 130, the UE 110 may determine whether the response is an error response (may be specific error response or not). When the response is not an error response (i.e., the second HTTP request is successful), the UE 110 may record the second encoding scheme. That is to say, the UE 110 may adopt the second encoding scheme for later HTTP request. Then, the UE 110 may display the latest service status based on the response through the display device 116 or performs following operations associated with the supplementary service. When the response is an error response (i.e., the second HTTP request is not successful), the UE 110 may display an error notification based on the response through the display device 116.

The UE 110 may also construct the URI of the second HTTP request based on a specific encoding or format defined in XCAP protocol. The constructed URI of the second HTTP request may comprise one or more specific characters (e.g., +, @, [,], double quotes, space symbol and so on). Specifically, in the constructed URI of the second HTTP request, the specific characters may be encoded by the UE 110 based on another URI encoding scheme different from the URI encoding scheme used to encode the specific characters in the first HTTP request. That is to say, the UE 110 may use another URI encoding scheme to encode the specific characters of the first HTTP request to generate the second HTTP request. In an embodiment, the URI encoding scheme for the second HTTP request may be that the specific characters in the second HTTP request are encoded based on percent-encoding (e.g., + is encoded to %2B based on percent-encoding). In another embodiment, the URI encoding scheme for the second HTTP request may be that the specific characters in the second HTTP request are not encoded based on percent-encoding (e.g., + is not encoded to %2B based on percent-encoding).

In the embodiments of the invention, the specific characters in the first HTTP request and the second HTTP request may be the unsafe characters and/or reserved characters defined in RFC1738 standard.

Figure 2:
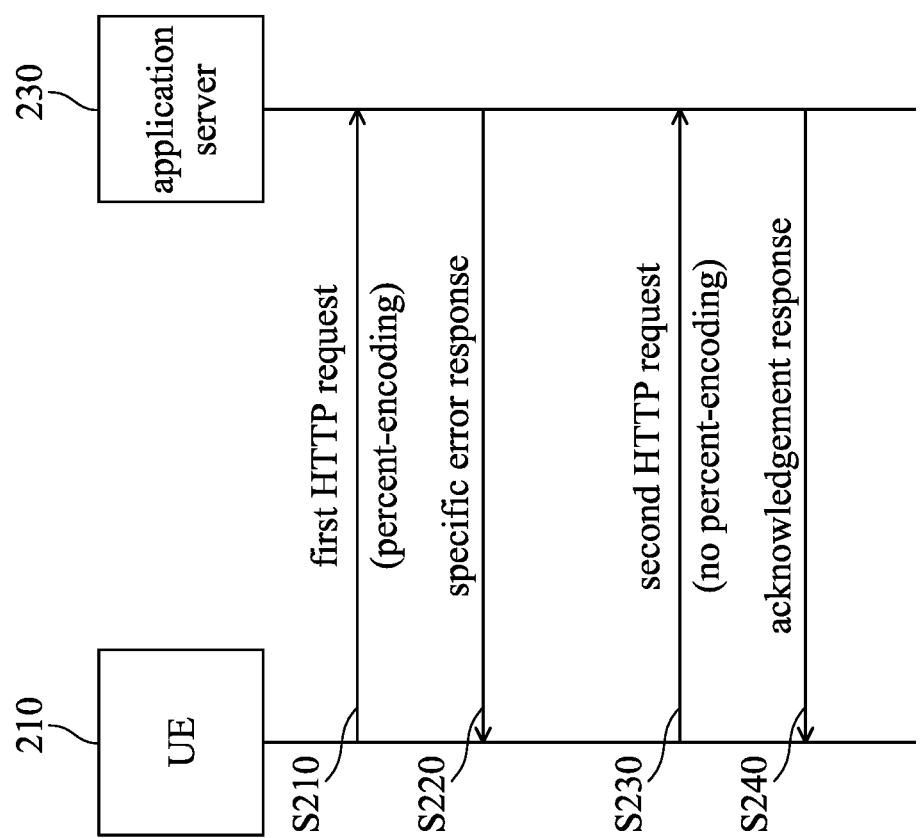
FIG. 2 illustrates a procedure for HTTP-URI error recovering according to an embodiment of the invention.

FIG. 2 illustrates a procedure for HTTP-URI error recovering according to an embodiment of the invention. In step S210, the UE 210 transmits a first HTTP request with a first URI encoding scheme to the application server 230. In the embodiment, the first URI encoding scheme is that the specific characters in the first HTTP request are encoded based on percent-encoding (e.g., + is encoded to %2B based on percent-encoding).

In step S220, the UE 210 receives a specific error response (e.g., a Bad Request error response, a Not Found error response or a Conflict error response) from the application server 230.

In step S230, the UE 210 transmits a second HTTP request with a second URI encoding scheme to the application server 230. In the embodiment, the second URI encoding scheme is that that the one or more specific characters in the second HTTP request are not encoded based on percent-encoding (e.g., + is not encoded to %2B based on percent-encoding).

In step S240, when the second HTTP request is successful, the application server 230 may transmit an acknowledgement response (e.g., 200 OK) to the UE 210.

Figure 3:
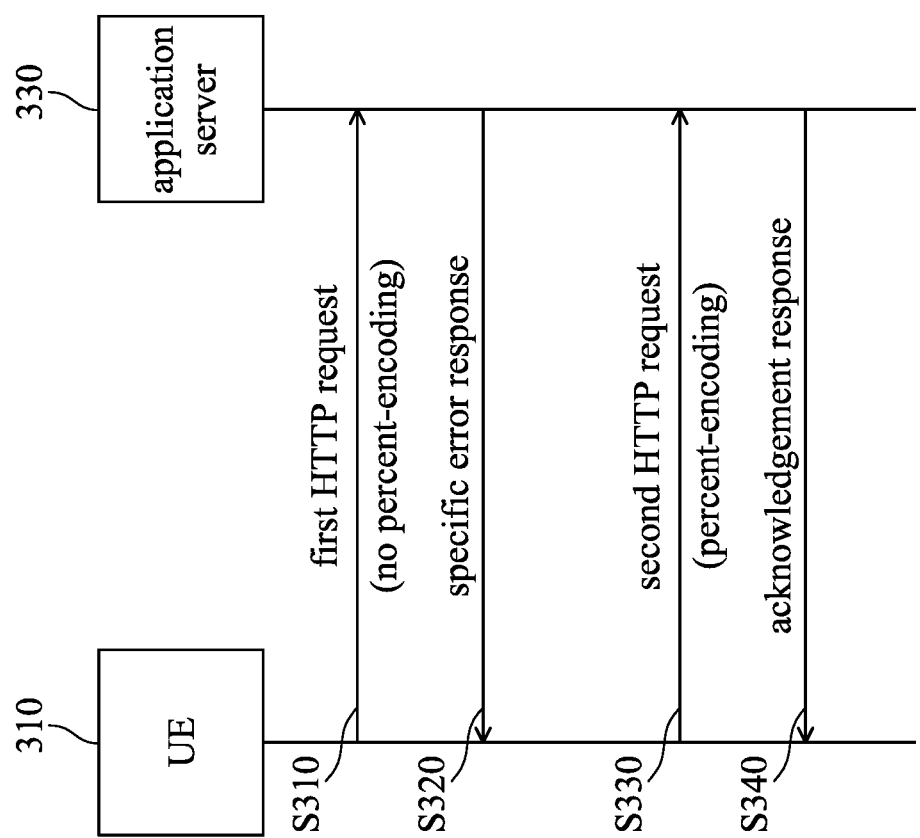
FIG. 3 illustrates a procedure for HTTP-URI error recovering according to another embodiment of the invention.

FIG. 3 illustrates a procedure for HTTP-URI error recovering according to another embodiment of the invention. In step S310, the UE 310 transmits a first HTTP request with a first URI encoding scheme to the application server 230. In the embodiment, the first URI encoding scheme is that the specific characters in the first HTTP request are not encoded based on percent-encoding (e.g., + is not encoded to %2B based on percent-encoding).

In step S320, the UE 310 receives a specific error response (e.g., a Bad Request error response, a Not Found error response or a Conflict error response) from the application server 330.

In step S330, the UE 310 transmits a second HTTP request with a second URI encoding scheme to the application server 330. In the embodiment, the second URI encoding scheme is that that the one or more specific characters in the second HTTP request are encoded based on percent-encoding (e.g., + is encoded to %2B based on percent-encoding).

In step S340, when the second HTTP request is successful, the application server 230 may transmit an acknowledgement response (e.g., 200 OK) to the UE 210.

Figure 4A:
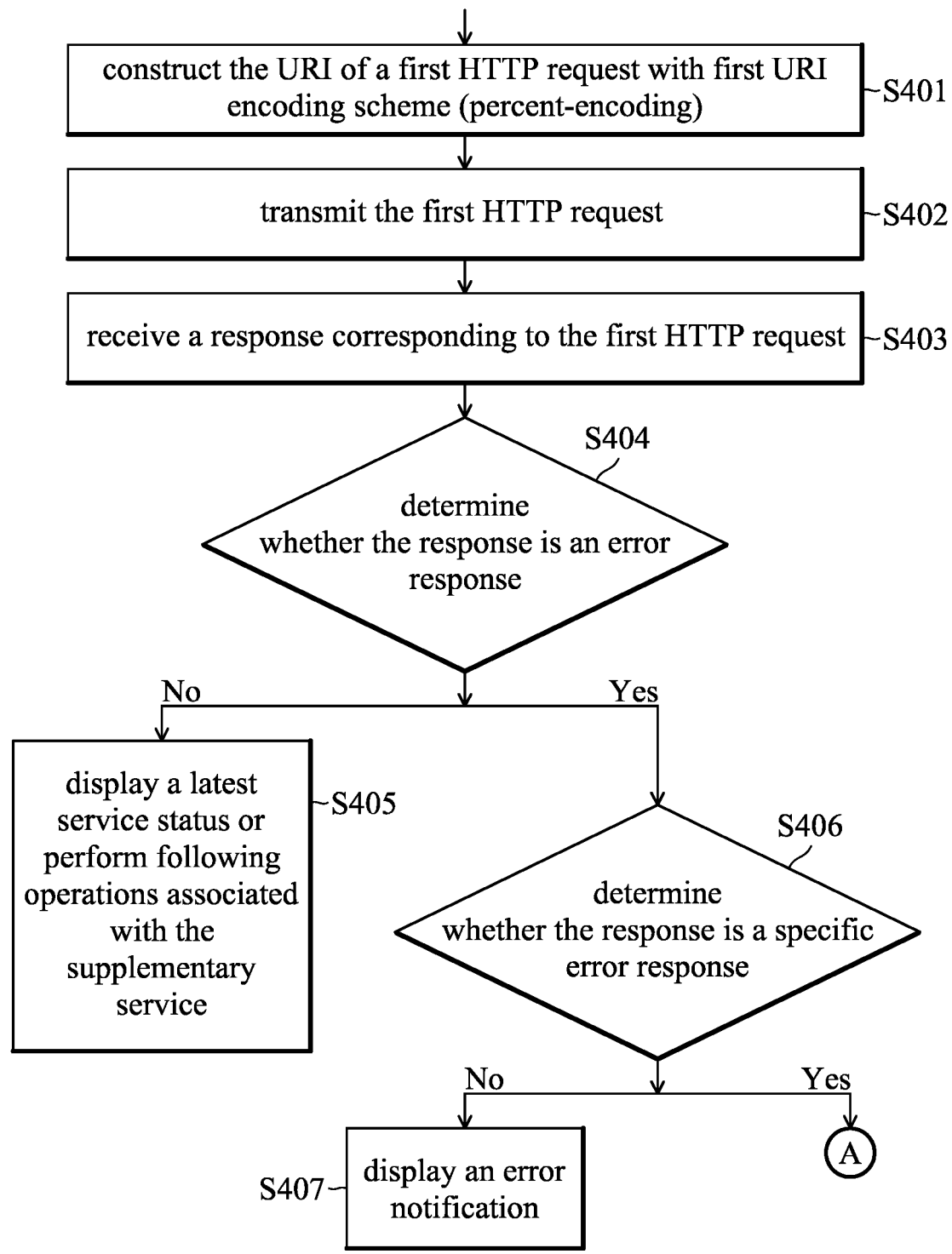
FIGS. 4A-4B are flow chart illustrating a HTTP-URI error-recovery method according to an embodiment of the invention.
Figure 4B:
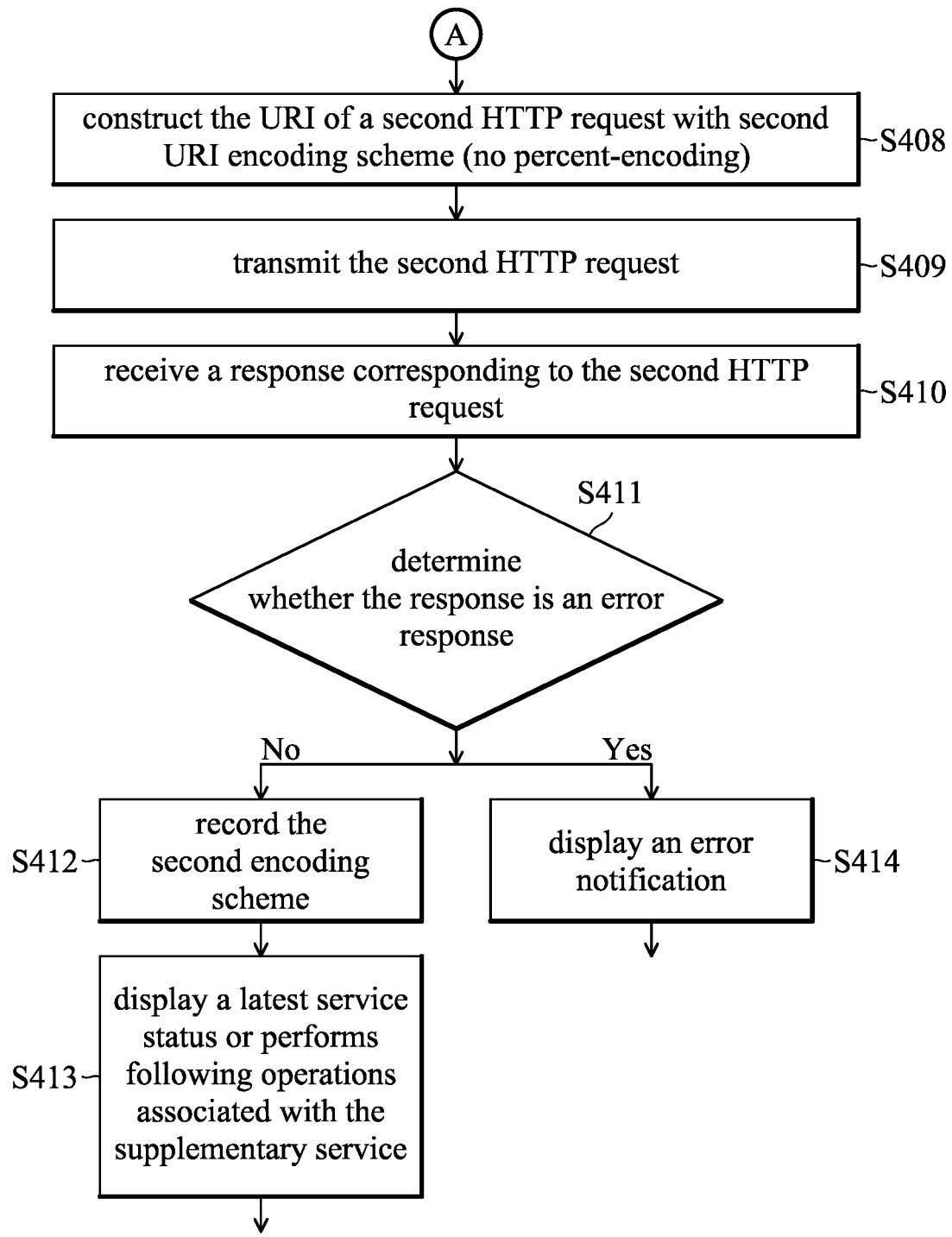

FIGS. 4A-4B is flow chart illustrating a HTTP-URI error-recovery method according to an embodiment of the invention. The HTTP-URI error-recovery method can be applied to the communication system 100. As shown in FIGS. 4A-4B, in step S401, the UE 110 may construct the URI of a first HTTP request with first URI encoding scheme. In the embodiment, the first URI encoding scheme is that the specific characters in the first HTTP request are encoded based on percent-encoding (e.g., + is encoded to %2B based on percent-encoding). In the embodiment, after the UE 110 construct the URI of the first HTTP request, the UE 110 may further construct the head and data of the first HTTP request.

In step S402, the UE 110 may transmit the first HTTP request with the first URI encoding scheme to the application server 130 through the interface 150 (i.e., Ut interface).

In step S403, the UE 110 may receive a response corresponding to the first HTTP request from the application server 130.

In step S404, the UE 110 may determine whether the response is an error response.

If the response is not an error response, step S405 is performed. In step S405, the UE 110 may display the latest service status or performs following operations associated with the supplementary service.

If the response is an error response, step S406 is performed. In step S406, the UE 110 may determine whether the response is a specific error response (e.g., a Bad Request error response, a Not Found error response or a Conflict error response).

If the error response is not a specific error response, step S407 is performed. In step S407, the UE 110 may display an error notification.

If the error response is a specific error response, step S408 is performed. In step S408, the UE 110 may construct the URI of a second HTTP request with second URI encoding scheme. In the embodiment, the second URI encoding scheme is that the specific characters in the second HTTP request are not encoded based on percent-encoding (e.g., + is not encoded to %2B based on percent-encoding).

In step S409, the UE 110 may transmit the second HTTP request with the second URI encoding scheme to the application server 130 through the interface 150 (i.e., Ut interface).

In step S410, the UE 110 may receive a response corresponding to the second HTTP request from the application server 130.

In step S411, the UE 110 may determine whether the response is an error response.

If the response is not an error response, step S412 is performed. In step S412, the UE 110 may record the second encoding scheme. Then, in step S413, the UE 110 may display the latest service status or performs following operations associated with the supplementary service.

If the response is an error response, step S414 is performed. In step S414, the UE 110 may display an error notification.

Figure 5A:
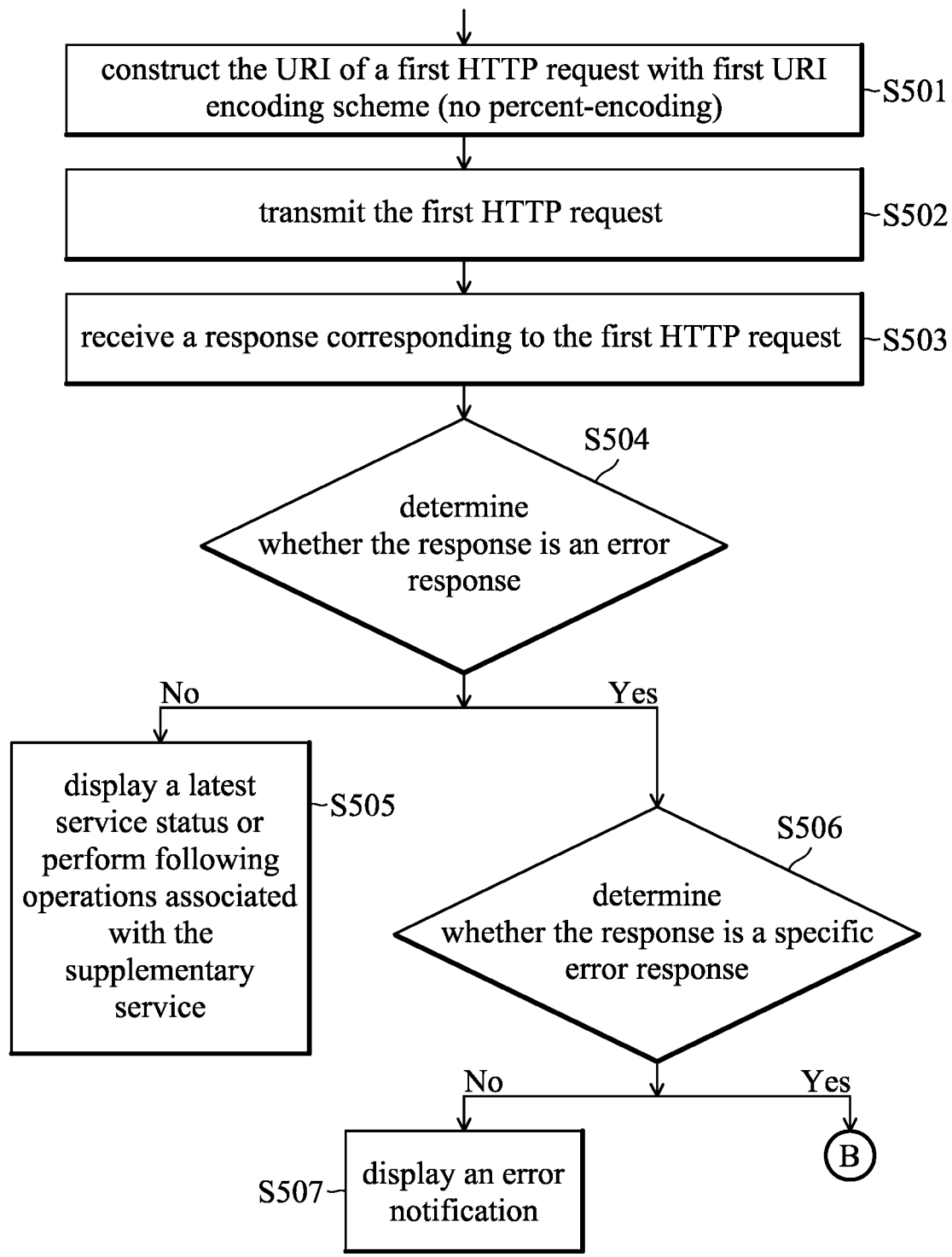
FIGS. 5A-5B are flow chart illustrating a HTTP-URI error-recovery method according to another embodiment of the invention.
Figure 5B:
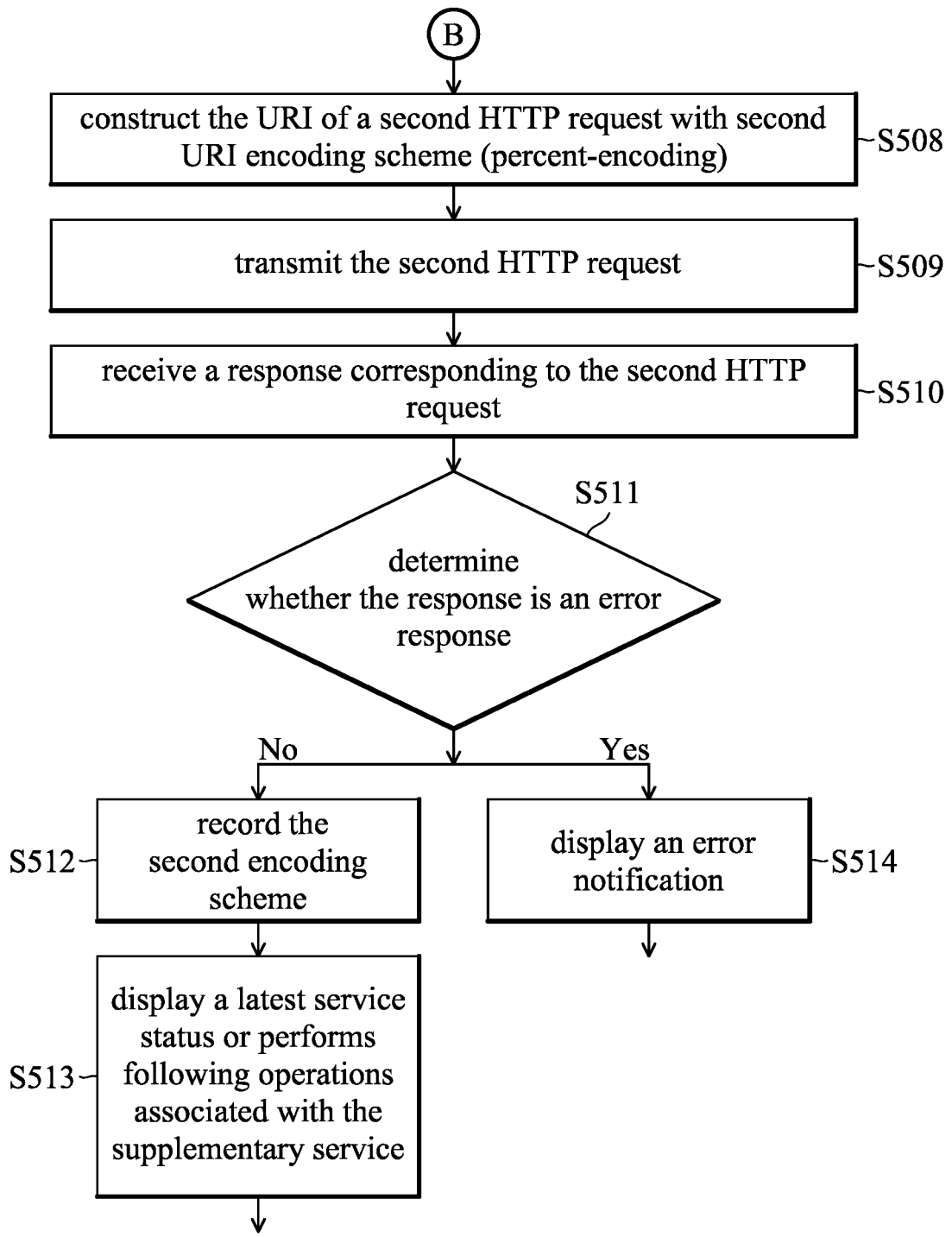

FIGS. 5A-5B are flow chart illustrating a HTTP-URI error-recovery method according to another embodiment of the invention. The HTTP-URI error-recovery method can be applied to the communication system 100. As shown in FIGS. 5A-5B, in step S501, the UE 110 may construct the URI of a first HTTP request with first URI encoding scheme. In the embodiment, the first URI encoding scheme is that the specific characters in the first HTTP request are not encoded based on percent-encoding (e.g., + is not encoded to %2B based on percent-encoding). In the embodiment, after the UE 110 construct the URI of the first HTTP request, the UE 110 may further construct the head and data of the first HTTP request.

In step S502, the UE 110 may transmit the first HTTP request with the first URI encoding scheme to the application server 130 through the interface 150 (i.e., Ut interface).

In step S503, the UE 110 may receive a response corresponding to the first HTTP request from the application server 130.

In step S504, the UE 110 may determine whether the response is an error response.

If the response is not an error response, step S505 is performed. In step S505, the UE 110 may display the latest service status or performs following operations associated with the supplementary service.

If the response is an error response, step S506 is performed. In step S506, the UE 110 may determine whether the response is a specific error response (e.g., a Bad Request error response, a Not Found error response or a Conflict error response).

If the error response is not a specific error response, step S507 is performed. In step S507, the UE 110 may display an error notification.

If the error response is a specific error response, step S508 is performed. In step S508, the UE 110 may construct the URI of a second HTTP request with second URI encoding scheme. In the embodiment, the second URI encoding scheme is that the specific characters in the second HTTP request are not encoded based on percent-encoding (e.g., + is not encoded to %2B based on percent-encoding).

In step S509, the UE 110 may transmit the second HTTP request with the second URI encoding scheme to the application server 130 through the interface 150 (i.e., Ut interface).

In step S510, the UE 110 may receive a response corresponding to the second HTTP request from the application server 130.

In step S511, the UE 110 may determine whether the response is an error response.

If the response is not an error response, step S512 is performed. In step S512, the UE 110 may record the second encoding scheme. Then, in step S513, the UE 110 may display the latest service status or performs following operations associated with the supplementary service.

If the response is an error response, step S514 is performed. In step S514, the UE 110 may display an error notification.

In the HTTP-URI error-recovery methods provided in the invention, the encoding error for the specific characters in the HTTP request can be identified, when the UE receives a specific error response (e.g., a Bad Request error response, a Not Found error response or a Conflict error response).

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A Hyper Text Transfer Protocol (HTTP)-Uniform Resource Identifier (URI) error-recovery method, comprising:
   transmitting, by a user equipment (UE), a first HTTP request with a first URI encoding scheme to an application server through an interface;
   receiving, by the UE, a specific error response corresponding to the first HTTP request from the application server;
   transmitting, by the UE, a second HTTP request with a second URI encoding scheme to the application server based on the specific error response;
   receiving, by the UE, a response corresponding to the second HTTP request from the application server;
   determining, by the UE, whether the response is an error response; and
   recording, by the UE, the second URI encoding scheme in response to the response not being the error response; and displaying, by the UE, a latest service status based on the response.

2. The HTTP-URI error-recovery method of claim 1, wherein the interface is a Ut interface.

3. The HTTP-URI error-recovery method of claim 1, wherein the specific error response is a Bad Request error response, a Not Found error response or a Conflict error response.

4. The HTTP-URI error-recovery method of claim 1, wherein the first HTTP request and the second HTTP request comprise one or more specific characters.

5. The HTTP-URI error-recovery method of claim 4, wherein the first URI encoding scheme is that the one or more specific characters in the first HTTP request are encoded based on a percent-encoding and the second URI encoding scheme is that that the one or more specific characters in the second HTTP request are not encoded based on the percent-encoding.

6. The HTTP-URI error-recovery method of claim 4, wherein the first URI encoding scheme is that the one or more specific characters in the first HTTP request are not encoded based on a percent-encoding and the second URI encoding scheme is that that the one or more specific characters in the second HTTP request are encoded based on the percent-encoding.

7. The HTTP-URI error-recovery method of claim 4, wherein the one or more specific characters comprise unsafe characters and/or reserved characters.

8. The HTTP-URI error-recovery method of claim 1, further comprising:
   displaying, by the UE, an error notification based on the response in response to the response being the error response.

9. A user equipment (UE) for Hyper Text Transfer Protocol (HTTP)-Uniform Resource Identifier (URI) error-recovery, comprising:
   a transmitter, transmitting a first HTTP request with a first URI encoding scheme to an application server through an interface;
   a receiver, receiving a specific error response corresponding to the first HTTP request from the application server; and
   a processor, coupled to the transmitter and the receiver;
   wherein the transmitter transmits a second HTTP request with a second URI encoding scheme to the application server based on the specific error response, wherein the receiver further receives a response corresponding to the second HTTP request from the application server and the processor determines whether the response is an error response, and the UE further comprises a storage device, recording the second URI encoding scheme in response to the response not being the error response; and a display device, displaying a latest service status based on the response.

10. The UE of claim 9, wherein the interface is a Ut interface.

11. The UE of claim 9, wherein the specific error response is a Bad Request error response, a Not Found error response or a Conflict error response.

12. The UE of claim 9, wherein the first HTTP request and the second HTTP request comprise one or more specific characters.

13. The UE of claim 12, wherein the first URI encoding scheme is that the one or more specific characters in the first HTTP request are encoded based on a percent-encoding and the second URI encoding scheme is that that the one or more specific characters in the second HTTP request are not encoded based on the percent-encoding.

14. The UE of claim 12, wherein the first URI encoding scheme is that the one or more specific characters in the first HTTP request are not encoded based on a percent-encoding and the second URI encoding scheme is that that the one or more specific characters in the second HTTP request are encoded based on the percent-encoding.

15. The UE of claim 12, wherein the one or more specific characters comprise unsafe characters and/or reserved characters.

16. The UE of claim 9,
   wherein the display device displays an error notification based on the response in response to the response being the error response.

* * * * *